Dec. 2, 1958   R. B. MATTHEWS   2,862,665
FUEL CONTROL SYSTEM
Filed Jan. 4, 1954

INVENTOR.
Russell B. Matthews
BY
Seegert & Schwalbach
Attys

United States Patent Office 2,862,665
Patented Dec. 2, 1958

2,862,665

FUEL CONTROL SYSTEM

Russell B. Matthews, Wauwatosa, Wis., assignor to Baso Inc., Milwaukee, Wis., a corporation of Wisconsin Application January 4, 1954, Serial No. 401,816

4 Claims. (Cl. 236—9)

This invention relates to improvements in fuel control systems.

In the control of heating systems, particularly those having relatively large mass, it has been found desirable to subject the system-controlling thermostat to a relatively small amount of heat in addition to that generated by the heat source, the aforementioned additional heat causing the thermostat to respond more rapidly to a temperature rise and to thereby anticipate the effect of the heat source so that the latter is shut down before the thermostat would otherwise respond, thus preventing overheating of the space as a result of dissipation of heat from the source after the latter has been shut off.

It is a general object of the present invention to provide an improved thermostatically regulated fuel control system, said system being entirely self-powered and including a thermostat of novel construction and provided with anticipating means.

Another object of the invention is to provide an improved fuel control apparatus having a thermostat provided with contacts which not only control the operation of the heat source, but also control the operation of the anticipator.

Another object of the invention is to provide in the apparatus of the class described, an improved low resistance thermostat for low power circuits comprising an hermetically sealed expansible and contractible enclosure containing a volatile fluid fill expansible and contractible in response to temperature changes, there being heat generating means within said enclosure operable to heat said fill when the thermostat contacts are in one position, for example the position causing operation of the heat source, disposition of said heat generating means within said enclosure providing maximum efficient utilization of the heat generated by said means.

Another object of the invention is to provide an improved fuel control apparatus of the aforementioned character comprising a main burner and a pilot burner, there being an electromagnetic valve controlling the flow of fuel to the main burner and powered by current from a thermoelectric generator subject to the heat of the pilot burner, there being a second thermoelectric generator subject to the heat of the main burner for powering the anticipator.

Another object of the invention is to provide an improved fuel control apparatus of the character described wherein the thermoelectric circuits for the electromagnetic valve and for the anticipator are interconnected through the contacts of the thermostat in a manner so that both of said circuits are controlled by said thermostat contacts, without any danger of substantial energization of either of said circuits by the thermoelectric generator powering the other of said circuits.

Another object of the invention is to provide an improved fuel control system of the aforementioned character which provides 100 percent shut-off of the fuel on pilot burner outage.

Further objects and advantages of the invention will become apparent as the description proceeds, reference being had to the accompanying drawing illustrating one form of the invention and wherein.

Figure 1:
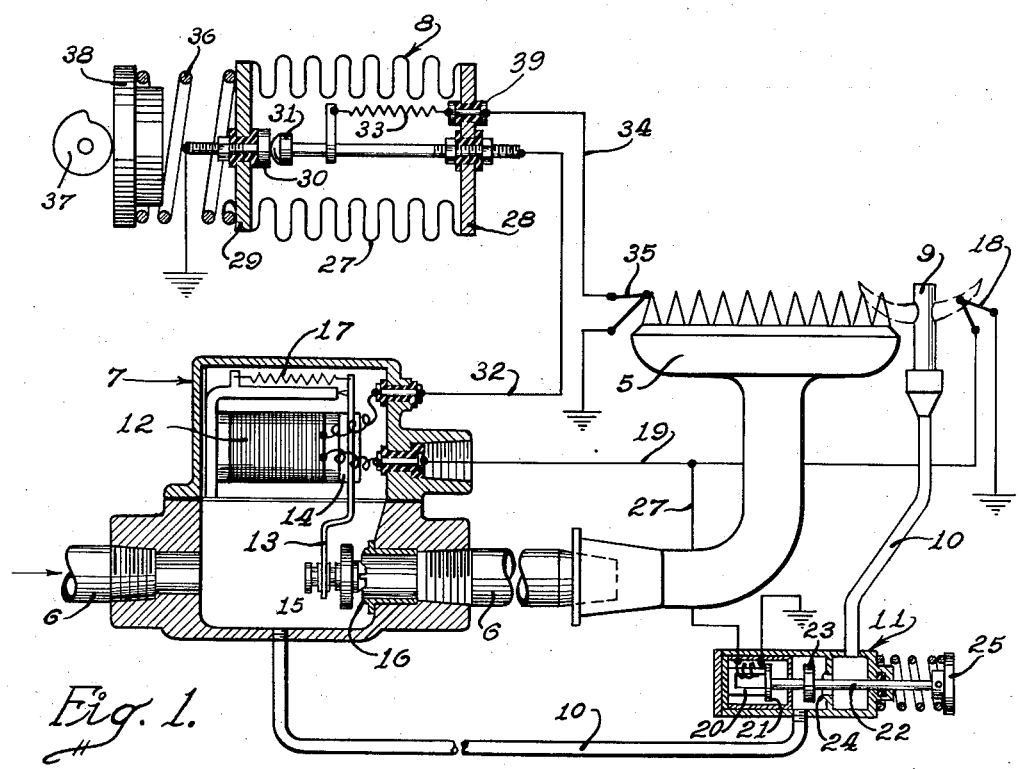
Figure 1 is a semi-diagrammatic elevational view of the improved fuel control system, parts being broken away and shown in vertical section.

Referring to Figure 1 of the drawing, the numeral 5 indicates a source of heat in the form of a main fuel burner supplied with fuel through a supply pipe 6, the latter having a direct-acting electromagnetic fuel control valve 7 interposed therein. The numeral 8 indicates a condition responsive circuit-controlling device, for example a thermostat, for controlling the operation of the valve 7, and hence the fuel flow to the burner 5. Associated with the main burner 5 is ignition means in the form of a pilot burner 9 to which is connected a fuel supply pipe 10, having an electromagnetic safety shut-off valve 11 interposed therein.

The direct-acting valve 7 includes an electromagnet 12 and a pivotally mounted arm 13 on which an armature 14 is carried, said armature being movable toward and away from the electromagnet. A valve member 15 is also carried by the arm 13 and cooperates with a valve seat 16 to control the flow of fuel through the valve 7. The arm 13 affords a resilient connection between the valve member 15 and the armature 14 to provide for the storage of energy therein during initial attractive movement to the armature and prior to opening movement of the valve member 15. A spring 17 biases the arm 13 in a valve closing direction, and it will be noted that the valve member 15 is also biased in a closing direction by the pressure of the fuel within the valve 7.

The valve 7 is of the type which is operable on the power generated by a single thermoelectric generator, for example a thermocouple 18 subject to the heat of the pilot burner 9. As shown in Figure 1 a conductor 19 connects one terminal of the thermocouple 18 with one terminal of the electromagnet 12, the other terminal of said thermocouple being grounded.

The safety shut-off valve 11 includes an electromagnet 20 and an armature 21 which is movable toward and away from said electromagnet. The armature 21 is mounted on an axially slidable stem 22 which also carries a valve member 23 cooperable with a valve seat 24 to control the flow of fuel to the pilot burner 9. The stem 22 also carries a manual reset button 25, and a spring 26 biases the button 25, stem 22, valve 23 and armature 21 to the right as viewed in Figure 1. The electromagnet 20 is connected in parallel circuit relationship with the thermocouple 18, said relationship being provided by a conductor 27 connecting one terminal of said electromagnet with the conductor 19, and by grounding of the other terminal of said electromagnet. When the electromagnet 20 is energized by current from the thermocouple 18, and the armature 21 is set into engagement with the electromagnet by depression of the reset button 25, said armature is held in attracted position by the electromagnet against the bias of the spring 26, and the valve member 23 is at the same time held in the open position shown, permitting fuel flow to the pilot burner 9.

The thermostat 8 comprises an hermetically sealed expansible and contractible enclosure in the form of a bellows 27 having a fixed end wall 28 and a movable end wall 29. The bellows 27 contains a suitable volatile fluid fill which is expansible and contractible in response to temperature changes, for example ethyl ether, isopentane or isopropyl alcohol. The movable bellows wall 29 carries a low resistance contact 30 which may be grounded, and the fixed bellows wall 28 insulatably carries a low resistance contact 31 which coacts with the contact 30. A conductor 32 connects the contact 31 with the other terminal of the electromagnet 12 of valve 7 to complete the series circuit between said contacts, the electromagnet 12 and the thermocouple 18.

Disposed within the bellows 27 and having one terminal thereof connected to the contact 31 is an anticipator 33 in the form of an electrical resistance type heating element. The other end of the anticipator 33 is connected to a terminal 39 which insulatably extends through the bellows end wall 28 and is connected, by means of a conductor 34, to one terminal of a thermoelectric generator 35, the latter being positioned to be subject to the heat of the main burner 5. The generator 35 may take the form of a thermocouple and has its other terminal grounded as shown. It is apparent that a series circuit relationship also exists between the contacts 30 and 31, anticipator 33 and the thermocouple 35.

Figure 2:
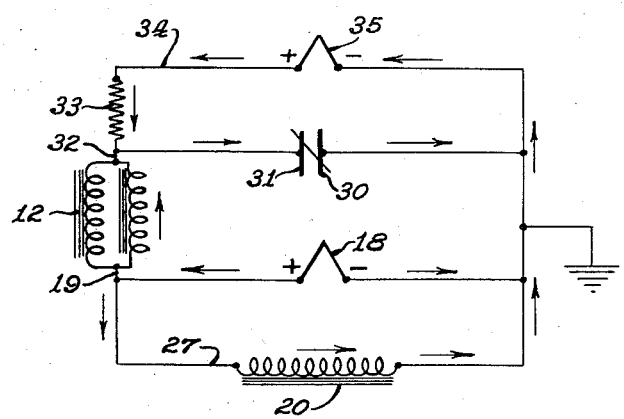
Figure 2 is a schematic wiring diagram of the system shown in Figure 1.

As shown most clearly in Figure 2, the contacts 30 and 31 form part of a lead which is common to two circuits, i. e. the circuit including the thermoelectric generator 18, and the circuit including the thermoelectric generator 35, and as such, said contacts control both of said circuits simultaneously. The arrows in Figure 2 illustrate the current flow in the improved fuel control system, and it is apparent therein that the polarity of the thermocouples 18 and 35 is so arranged that said thermocouples oppose each other. In addition, the resistances of the various components of the system are properly matched to prevent any substantial energization of either of the aforementioned series circuits by current from the thermocouple in the other circuit.

The thermostat 8 may be provided with means for adjusting the temperature control point thereof, said means comprising a compression spring 36 biasing the movable bellows end wall 29 toward the end wall 28. The force exerted by the spring 26 on the wall 29 may be adjusted by means of a cam 37 engaging a plate 38 which, in turn, engages the outer end of the spring 36 as shown. An increase in the force exerted by the spring 36 on the wall 29 raises the temperature control point, and a decrease in said force lowers said control point.

In the operation of the improved fuel control apparatus the thermostat 8 may function as a variable resistance device as regards current flow between the contacts 30 and 31, sufficient thermoelectric current for operation of the apparatus being permitted to flow therebetween when the contact resistance is below a predetermined value, and insufficient thermoelectric current for operation of the apparatus being permitted to flow when the contact resistance is above said predetermined value.

Assume the initial condition in which the contacts 30 and 31 are separated sufficiently to prevent substantial thermoelectric current flow therebetween, the safety shut-off valve 11 is open, and the pilot burner 9 is functioning properly so that current from the thermocouple 18 energizes the electromagnet 20. With no substantial current flowing between the contacts 30 and 31, the electromagnet 12 of the valve 7 is deenergized, or at any rate the current flowing therethrough is below the drop-out value of said electromagnet, so that the spring 17 and the fluid pressure within the valve 7 seals the valve member 15 on the seat 16 to prevent fuel flow to the main burner 5.

The thermostat 8, being located in the space to be heated by the main burner 5, senses the temperature within said space, and as said space cools, the contact 30 is moved by contraction of the bellows fill toward and into low resistance engagement with the contact 31, to permit current from the thermocouple 18 to flow through the electromagnet 12 in sufficient quantity to energize the latter and cause it to open the valve 15. This permits fuel flow to the main burner 5, and ignition of said fuel by the pilot burner flame causes heating of the thermocouple 35. Current generated by the thermocouple 35 energizes the anticipator 33, which, in turn, generates a small quantity of heat within the bellows 27. Since the anticipator 33 is located within the bellows 27 and is in intimate contact with the volatile fluid therein, maximum utilization is made of heat generated by said anticipator. This is important because of the fact that a thermocouple is capable of producing only a relatively small amount of electrical energy, and therefore said energy, upon conversion, provides only a small quantity of heat. In order for this small quantity of heat to be usable for a given purpose, for example as anticipating means, heat loss must be prevented so that said heat is utilized in its entirety for the given purpose.

As the space is heated by the main burner 5, the bellows fill begins to expand. The heat from the anticipator 33 accelerates this expansion of the fill, so that the current flow between the contacts 30 and 31 is interrupted to close the valve member 15 earlier than said interruption would take place in the absence of the anticipator, i. e. before the temperature in the space reaches the upper limit of the desired range. Closure of the valve member 15, of course, shuts off all fuel flow to the main burner 5. Simultaneously with closure of the valve member 15 the anticipator 33 begins to cool because current flow in the anticipator circuit is interrupted simultaneously with that of circuit of the valve 7. This permits the anticipator to cool immediately, rather than to continue to supply as long as the thermocouple 35 remains hot and continues to generate a current. Unwanted expansion of the bellows fill after interruption of the current flow is thereby prevented. The anticipation afforded by the anticipator 33 allows for continued heating of the space by heat dissipated from the mass of the heating source after the burner 5 is extinguished, and it thereby prevents overheating of said space.

It should be noted that since the thermocouple 35 is heated by the main burner flame and not by the pilot burner flame, the anticipator 33 can generate heat only when anticipation is needed, i. e. when the main burner is operating. It should also be noted that since the anticipator is energized by power from a source other than the power source for the valve 7, the anticipator does not drain any power away from said valve. In spite of the aforementioned independence of said power sources, both of said sources are under the control of the single set of contacts 30 and 31.

The improved fuel control apparatus, being entirely self-powered, is independent of any electrical utility. Complete safety is afforded by virtue of the fact that on outage of the pilot burner 9, the thermocouple 18 cools to deenergize both the electromagnet 12 and the electromagnet 20, thus causing closure of the valves 7 and 11 and providing 100 percent shut off of the fuel.

The specific illustrations and corresponding descriptions are used for the purpose of disclosure only and are not intended to impose unnecessary limitations on the claims or to confine the patented invention to a particular use. Various changes and modifications may be made without departing from the spirit of the invention, and all of such changes are contemplated as may come within the scope of the claims.

What is claimed as the invention is:

1. In combination, a low resistance control circuit having a thermoelectric generator as its sole source of power and including a cycling type thermoelectrically operable control valve, enclosed low resistance contacts in said control circuit for cycling said valve by variation of the contact resistance, condition responsive means for actuating said contacts to vary the contact pressure and hence the contact resistance in response to the ambient condition, thermoelectrically energizable means for supplying artificial heat to said contact actuating means, and a low resistance auxiliary circuit having a thermoelectric generator as its sole source of power for energization of said heat supplying means, said auxiliary circuit also including said contacts and being under control thereof whereby said valve and heat supplying means are cycled simultaneously by said contacts, the polarity of the generators of said control and auxiliary circuits being arranged so that said generators oppose each other, and the resistance of said circuits being matched to prevent any substantial energization of one of said circuits by the generator of the other circuit.

2. In combination, a low resistance control circuit having a thermoelectric generator as its sole source of power, a temperature responsive circuit controlling device having contacts in said control circuit for control of the latter by variation of the contact resistance, said contacts being encapsulated within an hermetically sealed enclosure expansible and contractible in response to variations in ambient temperature to effect relative movement of said contacts, thermoelectrically energizable means within said enclosure for supplying artificial heat within said enclosure, and a low resistance auxiliary circuit having a thermoelectric generator as its sole source of power for energization of said heat supplying means, said auxiliary circuit also including said contacts and being under control thereof, the polarity of the generators of said control and auxiliary circuits being arranged so that said generators oppose each other, and the resistance of said circuits being matched to prevent any substantial energization of one of said circuits by the generator of the other circuit.

3. In a system for controlling the flow of fuel to fuel burning apparatus including a main burner, and an ignition burner for said main burner, the combination of a low resistance control circuit having as its sole source of power a thermoelectric generator responsive to the heat of said ignition burner, a thermoelectrically operated valve in said circuit for control of fuel supply to said main burner, a temperature responsive circuit controlling device having contacts in said control circuit for control of the latter by variation of the contact resistance, said contacts being encapsulated within an hermetically sealed enclosure and operable in response to changes in ambient temperature for control of said circuit, thermoelectrically energizable means positioned within said enclosure for supplying artificial heat to said enclosure, and a low resistance auxiliary circuit having a thermoelectric generator as its sole source of power for energization of said heat supplying means, said auxiliary circuit also including said contacts and being under control thereof, the polarity of the generators of said control and auxiliary circuits being arranged so that said generators oppose each other, and the resistance of said circuits being matched to prevent any substantial energization of one of said circuits by the generator of the other circuit.

4. Control apparatus comprising, in combination a low resistance electrical circuit, condition responsive means having in said circuit enclosed low resistance contacts operable between open and closed positions, a main valve for directly controlling a main flow of fluid, a first thermoelectric generator for energizing said circuit, an electromagnetic operator in said circuit acting electrically and directly to operate said valve under the direct control of said condition responsive means, means for supplying artificial heat to said condition responsive means, and a second thermoelectric generator for energizing said heat supplying means, said second thermoelectric generator and said heat supplying means also being connected in circuit with said contacts, whereby artificial heat is supplied to said condition responsive means only when fuel is permitted to flow to said main burner, the polarity of the generators of said control and auxiliary circuits being arranged so that said generators oppose each other, and the resistance of said circuits being matched to prevent any substantial energization of one of said circuits by the generator of the other circuit.

References Cited in the file of this patent

UNITED STATES PATENTS

| | | |
|---|---|---|
| 1,265,765 | Ferris | May 14, 1918 |
| 1,564,804 | Warren | Dec. 8, 1925 |
| 1,874,909 | Conklin | Aug. 30, 1932 |
| 2,024,060 | Peralta | Dec. 10, 1935 |
| 2,073,286 | Raney | Mar. 9, 1937 |
| 2,112,750 | Price | Mar. 29, 1938 |
| 2,148,491 | Moore | Feb. 28, 1939 |
| 2,280,353 | Ray | Apr. 21, 1942 |
| 2,349,443 | McCarty | May 23, 1944 |
| 2,456,907 | Berberich | Dec. 21, 1948 |
| 2,592,952 | Ray | Apr. 15, 1952 |
| 2,717,123 | Hilgert et al. | Sept. 6, 1955 |